US007678451B2

(12) United States Patent
Gelissen et al.

(10) Patent No.: US 7,678,451 B2

(45) Date of Patent: Mar. 16, 2010

(54) LASER LIGHT ABSORBING ADDITIVE

(75) Inventors: Francischus W. M. Gelissen, Selfkant (DE); Franciscus G. H. Van Duijnhoven, Helmond (NL)

(73) Assignee: Merck Patent GmbH, Darmstadt (DE)

(*) Notice: Subject to any disclaimer, the term of this patent is extended or adjusted under 35 U.S.C. 154(b) by 911 days.

(21) Appl. No.: 10/536,399

(22) PCT Filed: Nov. 6, 2003

(86) PCT No.: PCT/NL03/00773

§ 371 (c)(1), (2), (4) Date: Jun. 21, 2005

(87) PCT Pub. No.: WO2004/050766

PCT Pub. Date: Jun. 17, 2004

(65) Prior Publication Data

US 2006/0074165 A1 Apr. 6, 2006

(30) Foreign Application Priority Data

Dec. 4, 2002 (NL) .................................... 1022081
May 12, 2003 (NL) .................................... 1023385

(51) Int. Cl.
*C08L 101/00* (2006.01)

(52) U.S. Cl. ........................... 428/404; 428/407; 522/2; 525/165; 525/166

(58) Field of Classification Search ..................... 522/2; 525/165, 166; 428/404, 407
See application file for complete search history.

(56) References Cited

U.S. PATENT DOCUMENTS

| | | | | |
|---|---|---|---|---|
| 4,626,263 | A * | 12/1986 | Inoue et al. | 96/99 |
| 4,847,322 | A * | 7/1989 | Akkapeddi et al. | 525/10 |
| 5,177,156 | A * | 1/1993 | Aritomi et al. | 525/393 |
| 5,204,438 | A * | 4/1993 | Snow et al. | 528/25 |
| 5,234,841 | A * | 8/1993 | Sutton | 436/533 |
| 5,300,572 | A * | 4/1994 | Tajima et al. | 525/167 |
| 2003/0143184 | A1* | 7/2003 | Seo et al. | 424/78.17 |
| 2004/0171777 | A1* | 9/2004 | Le et al. | 526/286 |
| 2006/0142404 | A1* | 6/2006 | Berge et al. | 521/142 |
| 2009/0075543 | A1* | 3/2009 | Zhang et al. | 442/199 |

FOREIGN PATENT DOCUMENTS

| | | |
|---|---|---|
| EP | 0 330 869 | 9/1989 |
| WO | 01/00719 | 1/2001 |

OTHER PUBLICATIONS

International Search Report.

* cited by examiner

*Primary Examiner*—Jeffrey C Mullis
(74) *Attorney, Agent, or Firm*—Nixon & Vanderhye P.C.

(57) ABSTRACT

Laser light absorbing additive comprising particles that contain at least a first polymer with a first functional group and 0-95 wt. % of an absorber, the weight percentage relating to the total of the first polymer and the absorber and the first polymer being bound in at least a part of the surface of the particles by means of the first functional group to a second functional group, which is bound to a second polymer.

18 Claims, 1 Drawing Sheet

LASER LIGHT ABSORBING ADDITIVE

This application is the US national phase of international application PCT/NL2003/000773 filed 6 Nov. 2003 which designated the U.S. and claims benefit of NL 1022081, dated 4 Dec. 2002 and NL 1023385, dated 12 May 2003, the entire content of each of which is hereby incorporated by reference.

FIELD

The invention relates to a laser light absorbing additive.

BACKGROUND AND SUMMARY

Such an additive is known from WO 01/0719, in which antimony trioxide with a particle size of at least 0.5 μm is applied as the absorber. The additive is applied in polymeric compositions in such a content that the composition contains at least 0.1 wt. % of the additive so as to be able to apply a dark marking against a light background in the composition. Preferably a nacreous pigment is further added to obtain a better contrast.

The known additive has the disadvantage that in many cases, in particular in compositions with polymers that in themselves are only weakly carbonizing, only a poor contrast can be obtained by laser irradiation.

The aim of the invention is, to provide an additive that, also when mixed into polymers that in themselves are weakly carbonizing, produces a composition that is capable of being written with laser light with a good contrast.

This aim is achieved according to the invention in that the additive comprises particles that contain at least a first polymer with a first functional group and 0-95 wt. % of an absorber, the weight percentage being related to the total of the first polymer and the absorber and the first polymer being bound in at least a part of the surface of the particles by means of the first functional group to a second functional group, which is bound to a second polymer.

Upon irradiation with laser light polymeric compositions that contain the additive according to the invention area found to produce an unexpectedly high contrast between the irradiated and non-irradiated parts. This contrast is also significantly higher than when a composition is applied that contains only the absorber and the first or the second polymer.

DETAILED DESCRIPTION

The additive according to the invention contains 0-95 wt. % of an absorber. Surprisingly, it has been found that an additive that does not contain a separate absorber and thus consists only of particles of the first polymer, surrounded by a layer of the second polymer bound to it, gives a significantly higher blackening under the influence of laser light than the first polymer as such.

Preferably, however, the additive contains at least 1 wt % or more, preferably at least 2, 3, 4, 5 or 10 wt % of an absorber because this results in faster blackening in the additive upon radiation with laser light.

The additive contains at most 95 wt. % of an absorber. At higher percentages the black forming capacity tends to decrease, possibly as a consequence of the relatively low amount of second and in particular first polymer present in the additive, the presence in the additive of which components has been found to be crucial in the composition of the invention as they seem to promote carbonisation as explained later.

Preferably the additive contains between 5 wt % and 80 wt % of an absorber. In this range the composition shows an optimal black forming capacity.

As an absorber use can be made of those substances that are capable of absorbing laser light of a certain wavelength. In practice this wavelength lies between 157 nm and 10.6 μm, the customary wavelength range of lasers. If lasers with larger or smaller wavelengths become available, other absorbers may also be considered for application in the additive according to the invention. Examples of such lasers working in the said area are $CO_2$ lasers (10.6 μm), Nd:YAG lasers (1064, 532, 355, 266 nm) and excimer lasers of the following wavelengths: $F_2$ (157 nm), ArF (193 nm), KrCl (222 nm), KrF (248 nm), XeCl (308 nm) and XeF (351 nm). Preferably Nd:YAG lasers and $CO_2$ lasers are used since these types work in a wavelength range which is very suitable for the induction of thermal processes that are applied for marking purposes. Such absorbers are known per se, as is the wavelength range within which they can absorb laser radiation. Various substances that may be considered for use as an absorber will be specified below.

The activity of the additive, preferably in the form of particles of a size between 200 nm and 50 μm mixed into a polymer, seems to be based on transmission of the energy absorbed from the laser light to the polymer. The polymer can decompose due to this heat release, with carbon remaining behind. This process is known as carbonization. The quantity of carbon that remains behind depends on the polymer. In the additives according to the state of the art the heat release to the environment in many cases appears to be insufficient to yield an acceptable contrast, in particular in the case of weakly carbonizing polymers, which upon decomposition leave little carbon behind.

Examples of suitable absorbers are oxides, hydroxides, sulphides, sulphates and phosphates of metals such as copper, bismuth, tin, aluminium, zinc, silver, titanium, antimony, manganese, iron, nickel and chromium and laser light absorbing (in)organic dyes. Particularly suitable are antimony trioxide, tin dioxide, barium titanate, titanium dioxide, aluminium oxide, copper phosphate and anthraquinone and azo dyes.

The additive according to the invention consists substantially of particles comprising a first polymer with a first functional group and 0-95, preferably 1-95 wt. % and more preferably 5-80 wt % of an absorber mixed into it. The weight percentage relates to the total of first polymer and absorber. This first polymer preferably has a polar character so that it can adhere with a certain force to the, as a rule inorganic, absorber, which as a rule also has a polar character. This ensures that, during processing of the additive, the absorber does not migrate to other components, to be discussed below, of compositions in which the additive is applied as laser light absorbing component.

The size of the additive particles in practice lies between 0.2 and 50 μm. For effective absorption of the laser light the size of these particles is preferably equal to at least approximately twice the wavelength of the laser light to be applied later. As an additive particle in this respect is considered an amount of absorber, depending on the size of the absorber particles consisting of a single or of more absorber particles, together with an amount of first polymer attached to it and separated from other additive particles by the second polymer. The size of a particle is understood to be the largest dimension in any direction, so for example the diameter for spherical particles and the length of the largest for ellipsoidal particles. A particle size of more than twice the wavelength of the laser light admittedly leads to a lower effectiveness in the absorption of the laser light but also to less influence on the decrease of the transparency due to the presence of the additive particles. The size preferably lies between 500 nm and 2.5 μm.

The absorber is present in the additive in the form of particles that are smaller than the size of the additive particles. The lower limit of the absorber particle size is determined by the requirement that the absorber must be capable of being mixed into the first polymer. It is known to the person skilled in the art that this miscibility is determined by the total surface of a certain weight quantity of absorber particles and the person skilled in the art will readily be able to determine the lower limit of the particle size of the absorber to be mixed in when knowing the desired size of the additive particles and the desired quantity of absorber to be mixed in. Generally the $D_{50}$ of the absorber particles will be not smaller than 100 nm and preferably not smaller than 500 nm. In the additive according to the invention the first polymer is bound in at least a part of the surface of the particles by means of the first functional group to a second functional group, which is bound to a second polymer.

Both the first and the second polymer are preferably thermoplastic polymers, as this will facilitate mixing of the absorber into the first polymer and, respectively, of the additive into a matrix polymer to make it suitable for laser writing.

The first polymer contains a first functional group and is bound by means of this group to a second functional group, which is bound to a second polymer. Thus, around the surface of an additive particle a layer of a second polymer, bound to the first polymer by the respective functional groups, is present, which at least partially screens off the first polymer in the particle from the environment around the additive particle. The thickness of the layer of the second polymer is not critical and as a rule it is negligible relative to the particle size and amounts to for example between 1 and 10% thereof. For a second polymer grafted with for example 1 wt. % MA, the quantity of second polymer relative to the first polymer lies for example between 2 and 50 wt. % and is preferably smaller than 30 wt. %. For other functional groups and/or other percentages of second functional groups, the quantity of the second polymer should be chosen such that a quantity of second functional groups is present that corresponds to the example given. As the number of second functional groups increases, the size of the additive particles is found to decrease.

Besides the second polymer bound to the first polymer preferably also a quantity of a third polymer that is not provided with a functionalized group is present, for example a polyolefin. It is also possible to choose the matrix polymer, into which the masterbatch is to be mixed later, as the third polymer. If desired this matrix polymer can also be added as a fourth polymer so as to later achieve improved mixing into a larger quantity of the matrix polymer. This is for example the case when silicone rubbers are applied as the matrix polymer. This non-functionalized third polymer may be the same as the bound second polymer but must at least be compatible, in particular miscible, with it. Thus, the said screening off of the first polymer in the particle from the environment is improved and also the mixing in of the additive according to the invention, which in this case can be considered to be a masterbatch of the additive in the non-functionalized third polymer, into a matrix polymer to make it laser writable can be improved. In such a masterbatch the proportion of the functionalized second plus the non-functionalized third polymer preferably lies between 20 and 60 wt. % of the total of the first, the second and the third polymer and the absorber. More preferably this proportion lies between 25 and 50 wt. %. Within said limits a masterbatch is obtained that can suitably be mixed in through melt processing. A higher proportion than the said 60% is allowable but in that case the quantity of the additive particles proper in the masterbatch is relatively small.

As first and second functional groups any two functional groups can be considered that are capable of reacting with each other. Examples of suitable functional groups are carboxylic acid groups and ester groups and the anhydride and salt forms thereof, an epoxy ring, an amine group, an alkoxy silane group or an alcohol group. It is known to the person skilled in the art in which combinations such functional groups can react with each other. The functional groups may be present in the first and second polymer per se, such as the terminal carboxylic acid group in a polyamide, but may also have been applied to them by for example grafting, as usually applied to provide for example polyolefins with a functional group, for example leading to the polyethylene grafted with maleic acid known per se.

Suitable first polymers are semi-crystalline or amorphous polymers that contain a first functional group that can react in the melt with the second functional group of the second polymer.

The melting point and the glass transition point, respectively, of the semi-crystalline and the amorphous polymers, respectively, preferably lies above 120 and above 100° C., respectively, and more preferably above 150° C. and above 120° C, respectively. Suitable second functional groups are for example hydroxy, phenolic, (carboxylic) acid (anhydride), amine, epoxy and isocyanate groups. Examples of suitable second polymers are polybutylene terephthalate (PBT), polyethylene terephthalate (PET), amine-functionalized polymers including semi-crystalline polyamides, for example polyamide-6, polyamide-66, polyamide-46 and amorphous polyamides, for example polyamide-6I or polyamide-6T, polysulphone, polycarbonate, epoxy-functionalized polymethyl (meth)acrylate, styrene acrylonitrile functionalized with epoxy or other functional groups as mentioned above. Suitable first polymers are those with the usual intrinsic viscosities and molecular weights. For polyesters the intrinsic viscosity lies for example between 1.8 and 2.5 dl/g, measured in m-cresol at 25° C. For polyamides the molecular weight lies for example between 5,000 and 50,000.

To choose a suitable first polymer the person skilled in the art will principally be guided by the desired degree of adhesion of the first polymer to the absorber and the required degree of carbonization thereof. This adhesion of the first polymer to the absorber most preferably is better than that of the second and third polymer (to be defined later) to the absorber. This secures the integrity of the absorbing additive during its processing. It is further unwanted that the absorber and the first polymer can chemically react with one another. Such chemical reactions cause degradation of absorber and/or the first polymer leading to undesired by-products, discolouration and poor mechanical and marking properties.

The first polymer preferably has a degree of carbonization of at least 5%, defined as the relative quantity of carbon that remains behind after pyrolysis of the polymer in a nitrogen atmosphere. At a lower degree of carbonization the contrast obtained upon laser irradiation decreases, at a higher degree the contrast increases until saturation occurs. It is surprising that the presence during laser irradiation of a polymer with such a low degree of carbonization, which in itself produces a scarcely visible contrast, as a compatible polymer in the additive according to the invention already makes it possible to obtain a high contrast. Polyamides and polyesters are very suitable due to their availability in a wide range of melting points and have a degree of carbonization of approximately 6% and 12%, respectively. Polycarbonate is very suitable partly due to its higher degree of carbonization of 25%. Furthermore polyamides and polycarbonate appear to exhibit good adhesive force with most inorganic absorbers, in particular also to aluminium oxide and titanium dioxide. Polyamide also exhibits good adhesion to antimony trioxide. In addition, the reaction of their, first, reactive group with for example the MA-grafted polymers that can advantageously be applied as grafted polymer, which will be discussed later, is irreversible under the circumstances under which the additive is usually applied.

Suitable as the second polymer are thermoplastic polymers having a functional group that can react with the first functional group of the first polymer to be applied. Particularly suitable as the second polymer are polyolefin polymers grafted with an ethylenically unsaturated functionalized compound. The ethylenically unsaturated functionalized compound grafted on the polyolefin polymer can react with the first functional group of the first polymer, for example with a terminal group of polyamide. Polyolefin polymers that may be considered for use in the composition according to the invention are those homo- and copolymers of one or more olefin monomers that can be grafted with an ethylenically unsaturated functionalized compound or in which the functionalized compound can be incorporated into the polymer chain during the polymerization process. Examples of suitable polyolefin polymers are ethylene polymers, propylene polymers. Examples of suitable ethylene polymers are all thermoplastic homopolymers of ethylene and copolymers of ethylene with as comonomer one or more α-olefins with 3-10 C-atoms, in particular propylene, isobutene, 1-butene, 1-hexene, 4-methyl-1-pentene and 1-octene, that can be prepared using the known catalysts such as for example Ziegler-Natta, Phillips and metallocene catalysts. The quantity of comonomer as a rule lies between 0 and 50 wt. %, and preferably between 5 and 35 wt. %. Such polyethylenes are known amongst other things by the names high-density polyethylene (HDPE), low-density polyethylene (LDPE), linear low-density polyethylene (LLDPE) and linear very low-density polyethylene (VL(L)DPE). Suitable polyethylenes have a density between 860 and 970 kg/$m^3$. Examples of suitable propylene polymers are homopolymers of propylene and copolymers of propylene with ethylene, in which the proportion of ethylene amounts to at most 30 wt. % and preferably at most 25 wt. %. Their Melt Flow Index (230° C., 2.16 kg) lies between 0.5 and 25 g/10 min, more preferably between 1.0 and 10 g/10 min. Suitable ethylenically unsaturated functionalized compounds are those which can be grafted on at least one of the aforesaid suitable polyolefin polymers. These compounds contain a carbon-carbon double bond and can form a side branch on a polyolefin polymer by grafting thereon. These compounds can be provided in the known way with one of the functional groups mentioned as suitable in the above.

Examples of suitable ethylenically unsaturated functionalized compounds are the unsaturated carboxylic acids and esters and anhydrides and metallic or non-metallic salts thereof. Preferably the ethylenic unsaturation in the compound is conjugated with a carbonyl group. Examples are acrylic, methacrylic, maleic, fumaric, itaconic, crotonic, methyl crotonic and cinnamic acid and esters, anhydrides and possible salts thereof. Of the compounds with at least one carbonyl group, maleic anhydride is preferred.

Examples of suitable ethylenically unsaturated functionalized compounds with at least one epoxy ring are, for example, glycidyl esters of unsaturated carboxylic acids, glycidyl ethers of unsaturated alcohols and of alkyl phenols and vinyl and allyl esters of epoxy carboxylic acids. Glycidyl methacrylate is particularly suitable.

Examples of suitable ethylenically unsaturated functionalized compounds with at least one amine functionality are amine compounds with at least one ethylenically unsaturated group, for example allyl amine, propenyl, butenyl, pentenyl and hexenyl amine, amine ethers, for example isopropenylphenyl ethylamine ether. The amine group and the unsaturation should be in such a position relative to each other that they do not influence the grafting reaction to any undesirable degree. The amines may be unsubstituted but may also be substituted with for example alkyl and aryl groups, halogen groups, ether groups and thioether groups.

Examples of suitable ethylenically unsaturated functionalized compounds with at least one alcohol functionality are all compounds with a hydroxyl group that may or may not be etherified or esterified and an ethylenically unsaturated compound, for example allyl and vinyl ethers of alcohols such as ethyl alcohol and higher branched and unbranched alkyl alcohols as well as allyl and vinyl esters of alcohol substituted acids, preferably carboxylic acids and $C_3$-$C_8$ alkenyl alcohols. Further the alcohols may be substituted with for example alkyl and aryl groups, halogen groups, ether groups and thioether groups, which do not influence the grafting reaction to any undesirable degree.

Examples of oxazoline compounds that are suitable as ethylenically unsaturated functionalized compounds in the framework of the invention are for example those with the following general formula

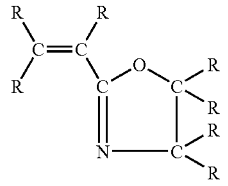

where each R, independently of the other hydrogen, is a halogen, a $C_1$-$C_{10}$ alkyl radical or a $C_6$-$C_{14}$ aryl radical.

The quantity of the ethylenically unsaturated functionalized compound in the polyolefin polymer functionalized by grafting preferably lies between 0.05 and 1 mgeq per gramme of polyolefin polymer.

As the third polymer the same polymers may be considered as those mentioned above for the second polymer, albeit in their non-functionalized form.

The second and in particular the third polymer may contain pigments, colorants and dyes. This has the advantage that no separate coloured masterbatch has to be added when the laser writable additive is mixed with a matrix polymer in those cases where a coloured composition is preferred.

The invention also relates to a process for the preparation of the additive according to the invention, comprising the mixing of a composition containing an absorber and a first polymer having a first functional group with a second polymer containing a second functional group that is reactive with the first functional group.

It has been found that in this way the additive is divided into particles, consisting of a mixture of the first polymer and the absorber, which at their surface are provided with a layer of the second polymer, so that after mixing of the additive into a matrix polymer an optimal contrast is obtained therein when it is laser written.

The composition containing the absorber and the first polymer can be prepared by mixing the absorber and a melt of the first polymer. The ratio between the quantity of the first polymer and the quantity of absorber in the composition lies between 90 vol. %: 10 vol. % and 60 vol. %: 40 vol. %. More preferably this ratio lies between 80 vol. %: 20 vol. % and 50 vol. %: 50 vol. %.

Said composition is mixed with a second polymer that contains a second functional group that is reactive with the first functional group. This mixing takes place above the melting point of both the first and the second polymer and preferably in the presence of a quantity of a non-functionalized third polymer. Third polymers that may be considered are in particular those which have been mentioned above as the second polymer, but in their non-functionalized form. This third polymer does not need to be the same as the functionalized second polymer. The presence of the non-functionalized third polymer ensures adequate melt processability of the total mixture so that the desired homogeneous distribution of the additive particles in the resulting masterbatch is obtained.

In the melt the functional groups react with each other and the screening layer of the second polymer is formed at at least a part of the surface of the additive particles. At some point the screening effect of the second polymer will become predominant and any unreacted first polymer present in the additive particles will no longer be able to pass to the surrounding melt. This screening effect is more effective as the difference in polarity between the first and second polymer is larger. In the above it was already indicated that the first polymer preferably has a polar character. It is also preferred for the second and third polymer to have a less polar character than the first one and more preferably the second and third polymer are completely or almost completely apolar.

The size of the additive particles in the masterbatch obtained depends on the quantity of second functional groups. The lower and upper limits within which additive particles of a suitable size are obtained appear to be dependent on the first polymer. The particle size decreases as the quantity of second functional groups increases and vice versa. If the quantity of second functional groups is too large, this results in particles that are too small and moreover in such a degree of binding of the second polymer to the first that this leads to demixing of the first polymer and the absorber particles. This leads to a reduction of the contrast upon radiation of an object into which the additive has been mixed in masterbatch form. If the quantity of second functional groups is too small, this results in such large additive particles that an inhomogeneous pattern with undesirable coarse speckles is formed upon irradiation of an object into which the additive particles have been mixed in masterbatch form. Furthermore the melt viscosity of the third polymer influences the size of the additive particles in the formed masterbatch. A higher melt viscosity leads to a lower particle size. With the above insights the person skilled in the art will be able, through simple experimentation, to determine the suitable quantity of second functional groups within the limits already indicated therefor in the above.

To obtain a laser writable polymer composition the additive according to the invention is mixed into a matrix polymer. It has been found that a composition of a matrix polymer and the additive according to the invention can be written with better contrast with laser light than the known compositions, in particular when the matrix polymer in itself is poorly laser writable. The laser writability is also better than when the absorber as such is mixed into the matrix polymer or is mixed only with either the first or the second polymer by itself.

The invention therefore also relates to a laser writable composition, comprising a matrix polymer and an additive according to the invention distributed therein.

The advantages of the laser writable composition according to the invention appear to full advantage in all matrix polymers but in particular when the matrix polymer has been chosen from the group consisting of polyethylene, polypropylene, polyamide, polymethyl (meth)acrylate, polyurethane, polyesters thermoplastic vulcanizates, of which SARLINK® is an example, thermoplastic elastomers, of which Arnitel® is an example, and silicone rubbers.

The laser writable composition according to the invention can also contain other additives known for enhancing certain properties of the matrix polymer or adding properties to it.

Examples of suitable additives are reinforcing materials [such as glass fibers and carbon fibers, nano-fillers like clays, including wollastonite, and micas], pigments,dyes and colorants, fillers [such as calcium carbonate and talcum], processing aids, stabilizers, antioxidants, plasticizers, impact modifiers, flame retardants, mould release agents, foaming agents.

The amount of additive can vary from very small amounts such as 1 or 2 volume % up to 70 or 80 volume % or more, relative to the volume of the compound formed. Additives will normally be applied in such amounts that any negative influence on the contrast of the laser marking obtainable by irradiating the composition will be limited to an acceptable extent. A filled composition that shows a remarkable good laser writability is a composition comprising a polyamide, in particular polyamide-6, polyamide 46 or polyamide 66, and talcum as a filler additive.

The laser writable composition according to the invention can be prepared by mixing the additive into the melted matrix polymer. To facilitate this mixing, the non-functionalized polymer, which serves as the support in the masterbatch, preferably has a melting point that is lower than or equal to that of the matrix polymer. Preferably the first polymer has a melting point that is at least equal to or higher than that of the matrix polymer. The non-functionalized polymer may be the same as the matrix polymer or differ from it. The latter also applies to the first polymer. Thus, it has been found that an absorber provided with a layer of a polymer composition in which the first polymer is polyamide and the second polymer a maleic anhydride grafted polyethylene produces a composition that is laser writable with high contrast both when mixed into a polyamide matrix and when mixed into a polyethylene matrix. This favourable effect is achieved both in polyamide and in polyethylene also if the first polymer is, for example, polycarbonate.

The quantity of additive depends on the desired density of the absorber in the matrix polymer. Usually the quantity of additive lies between 0.1 and 10 wt. % of the total of additive and matrix polymer and preferably it lies between 0.5 and 5 wt. % and more preferably between 1 and 3 wt. %. This gives a contrast that is adequate for most applications without essentially influencing the properties of the matrix polymer. If a dye is used as the additive, it should be taken into account that starting from a certain concentration colouring of the matrix polymer may take place.

When the additive is being mixed into the matrix polymer the shape of the additive particles may change due to the shear forces that occur, in particular they can become more elongated in shape, so that the size increases. This increase will generally be not larger than a factor 2 and if necessary this can be taken into account when choosing the particle size for the mixing into the matrix polymer.

The additive-containing matrix polymer can be processed and shaped using the techniques known for thermoplastics processing, including foaming. The presence of the laser writable additive usually will not noticeably influence the processing properties of the matrix polymer. In this way almost any object that can be manufactured from such a plastic can be obtained in a laser writable form. Such objects can for example be provided with functional data, barcodes, logos and identification codes and they can find application in the medical world (syringes, pots, covers), in the automotive business (cabling, components), in the telecom and E&E fields (GSM fronts, keyboards), in security and identification applications (credit cards, identification plates, labels), in advertising applications (logos, decorations on corks, golf balls, promotional articles) and in fact any other application where it is useful or otherwise desirable or effective to apply a pattern of some kind to an object substantially consisting of a matrix polymer.

The additive according to the invention can be obtained as described above by mixing of the absorber with the first polymer followed by mixing of the resulting mixture with the second polymer and optionally a quantity of a non-functionalized third polymer. From the resulting three-component mixture and, if a third polymer has also been co-mixed, from the resulting masterbatch, the additive according to the invention can be obtained in a pure form by removing a possibly non-bound part of the second polymer and the third polymer from the mixture. Suitable methods for this are for example extraction with a solvent for the second and, if present, the third polymer and microfiltration. For separation of particles in this pure form, further denoted as minimal particles, use is preferably made of a mixture or masterbatch in which the particle size of the additive lies between 500 nm and 20 μm, more preferably between 500 nm and 10 μm and most preferably between 500 nm and 2 μm to achieve optimum absorption of laser light and to enable applicability in very thin layers. A minimal particle consist of an additive particle and an outer layer of second polymer that is bound to the first polymer of the additive particle.

It has been found to be possible to apply the additive in this purified minimal particle shape on the surface of objects. The powder can be used as such in the form of a coating or varnish in which the minimal particles are stabilized in a binder. Suitable techniques known per se for this are for example screen-printing and offset printing. The resulting surface can then be written with a laser. The advantage of this method is that the additive does not need to be present in the entire object and can if desired also be applied only on those places where laser writability is desired. Applications can be found in painted plastic moulded articles with a light colour and for example in cards for identification and security applications.

The applied coating can, if desired, be covered with a, preferably transparent, layer for further protection of the coating and the pattern later written into it.

The invention therefore also relates to the use of the additive according to the invention, preferably in the form of minimal particles, for the application of a layer thereof on the surface of an object and to objects in which at least locally a layer is present that contains the additive according to the invention.

Another suitable form in which the additive according to the invention can be applied, in particular in the form in which a second and if desired also a third polymer is present, is a paste or a latex, in which particles consisting of the additive (e.g. minimal particles or minimal particles around which a small amount, up to 100 wt % of the total particle, of not-bound second polymer is present) are finely distributed in a dispersion medium that is not a solvent for the second and any third polymer. Such a paste or latex can be obtained by mixing particles consisting of the additive according to the invention and preferably a masterbatch of these particles in a third polymer with a quantity of the dispersion medium, for example under high shear in a twin-screw extruder in the presence of a stabilizer known per se for this purpose that ensures that the particles do not sediment out of the paste or latex. The ratio between the quantity of dispersion medium and the quantity of particles or the quantity of masterbatch determines the viscosity of the resulting mixture. With a relatively small quantity of dispersion medium and stabilizer a paste is obtained, with a relatively large quantity of dispersion medium and stabilizer a latex. Water has been found to be a very suitable dispersion medium.

For making a paste the particle size of the additive is preferably chosen to lie between 1 and 200 μm. Preferably the particle size lies between 1 and 90 μm, with as advantage that effective absorption of laser light and transparency when used in coatings can be obtained. For making a latex this particle size preferably lies between 50 nm and 2 μm and more preferably between 100 nm and 500 nm, so that it is suitable for application in thin layers. Paste and latex are suitable for the application of, in particular water-borne, coatings on all surfaces to which these adhere with a force that is adequate for the intended application. Paste and latex according to the invention are found to adhere particularly well to paper and plastics. In this way surfaces can be obtained which can be printed using laser light, for example in printers provided with a laser with a suitable wavelength and without application of toners, with non-fading graphics with a high contrast, for example text or photographs. This non-fading offers a great advantage over the current combinations of paper and printing means. A further advantage of in particular paper that has been provided with a layer of the paste or latex according to the invention described as water-borne is the possibility to recycle this paper in a water-based system. A latex is preferably applied as paper coating. As coating layer for plastic objects, for example dashboard foils, a paste is preferably applied.

A further suitable form in which the additive according to the invention can be applied is obtained by grinding a masterbatch of the additive according to the invention in the third polymer, for example cryogenically, to particles with a size between 100 μm and 1 mm, preferably to a size between 150 and 500 μm. In this form the additive according to the invention can be mixed into non-melt-processable polymers, such as crosslinked polymers or matrix polymers which degrade around their melting point or which have a very highly crystallinity. Examples of such matrix polymers are ultrahigh-molecular polyethylene (HMWPE), polypropylene oxide (PPO), fluoropolymers, for example polytetrafluorethylene (Teflon) and thermosetting plastics.

Figure 1:
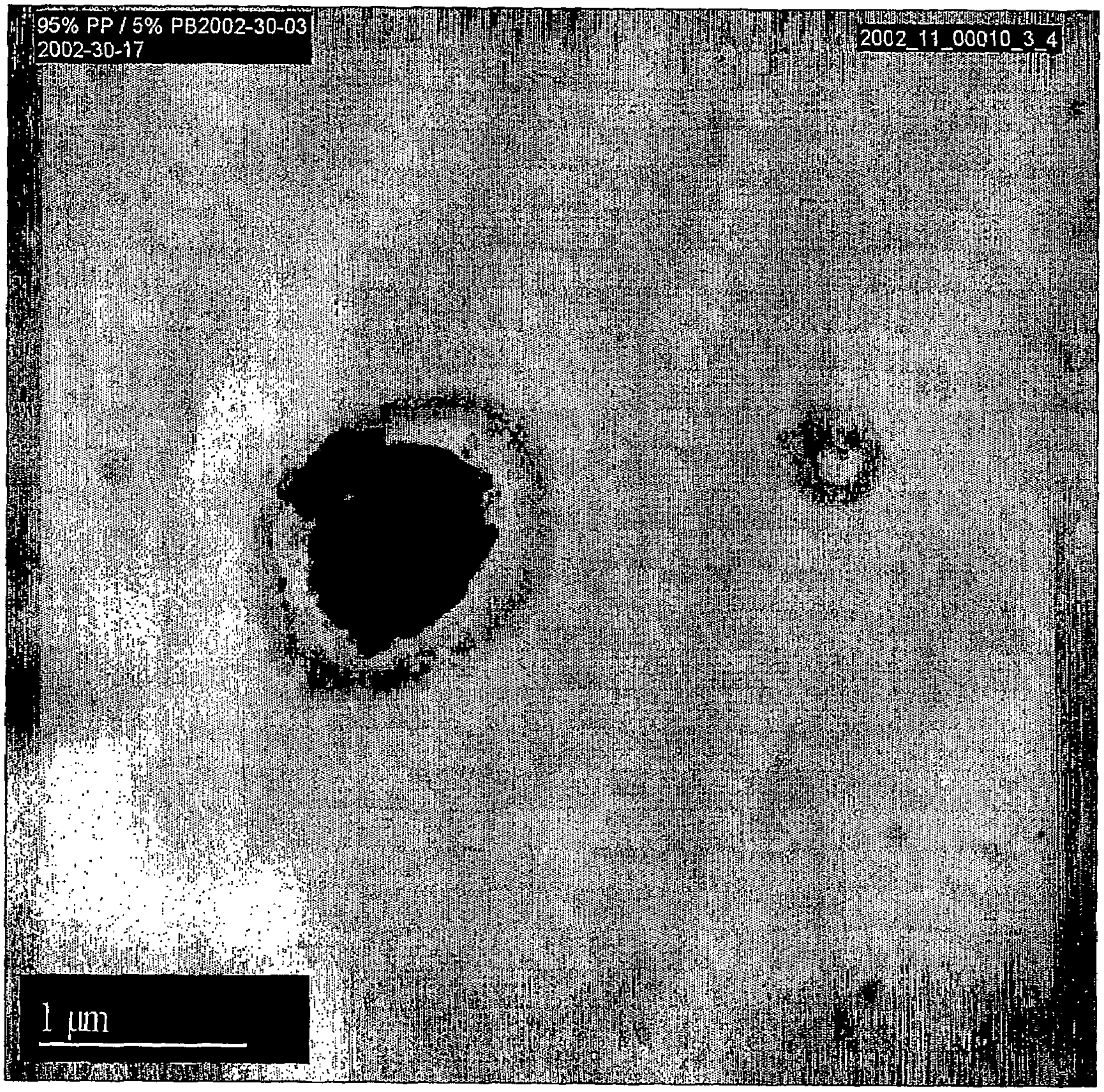
FIG. 1 show a TEM picture of laser writable composition LP7.

The invention will be elucidated on the basis of the following examples.

In the Examples and Comparative Experiments the following materials are used:

As first polymer:

P1-1. Polyamide K122 (DSM)

P1-2. Polycarbonate Xantar® R19 (DSM)

P1-3. Polybutylene terephthalate 1060 (DSM)

As the second polymer:

P2-1. Exact® polyethylene (DEXPlastomers) grafted with 1.1 wt. % MA

P2-2. Fusabond® M0525D polyethylene (Dupont) grafted with 0. 9 wt. % MA

As the third polymer:

P3-1. Exact 0230® polyethylene (DEXPlastomers)

P3-2. Propylene ethylene random copolymer RA112MN40 (DSM)

As the absorber:

A-1. Antimony trioxide with a $D_{60}$ of 1 μm (Campine)

A-2. Titanium dioxide

A-3. Macrolex® blue/violet

As the matrix polymer:

M-1. Polyamide K122 (DSM)

M-2. Polypropylene homopolymer 112MN40 (DSM)

M-3. Arnitel® EM 400 (DSM)

M4. Exact® 8201 polyethylene (DSM)

M-5 Sarlink® 6135N (DSM)

M-6 Polybutylene terephthalate 1060 (DSM)

M-7. KE 9611 U silicone rubber (ShinEtsu)

M-8. UVTRONIC® acrylate resin (SIPCA)

EXAMPLES I-VIII

Using a twin-screw extruder (ZSK 30 of Werner & Pfleiderer) a number of masterbatches, MB1-MB15, of the additive according to the invention in a third polymer were made. The absorber, first and second polymer used in the additive and the third polymer used and the respective proportions thereof in wt. % are shown in Table 1, as are the absorber content and the size of the formed additive particles in the masterbatch.

Using a Haake 350 cc kneader with Banbury kneading arms MB 16 and MB 17 were made by mixing MB2 with matrix polymer M7 as a fourth polymer in the quantities given in Table 1, which also shows the size of the formed additive particles in the final master batches M16 and M17.

The master batches MB1-MB 15 were made with a throughput of 35 kg/h at an extruder speed of 350-400 rpm. The feed zone, barrel and die temperature of the extruder and the outlet temperature of the material are 170, 240, 260 and 287° C., respectively, if polyamide (P1-1) is used as the first polymer and 180, 240, 260 and 260° C., respectively, if polycarbonate (P1-2) or PBT (P1-3) is used as the first polymer. Master batches MB16 and MB17 were made at a temperature of 150° C. and a kneader speed of 30-50 rpm.

EXAMPLE II AND COMPARATIVE EXPERIMENT A

Using a number of master batches from the previous Example a number of laser writable compositions, LP1-LP41, were prepared by mixing different quantities of masterbatch/pigment material into different matrix polymers on the aforesaid extruder and kneader, respectively. Compositions containing PA, PP, Arnitel, Exact, Sarlink and PBT were made with a ZSK 30 having feed zone, barrel, die and outlet temperature of the extruder as given below. The compositions containing Silicone rubber were made with a Haake kneader having kneader and outlet temperature as given below. In the compositions containing Acrylate resin the additive was applied in the form of minimal particles and the compositions were in a Dispermat mixer having mixing and outlet temperature as given below:

| | |
|---|---|
| M-1 (PA): | 160, 200, 220, 265 |
| M-2: (PP): | 160, 200, 210, 225 |
| M-3: (Arnitel): | 160, 200, 220, 237 |
| M-4: (Exact): | 100, 120, 150, 158 |
| M-5: (Sarlink): | 160, 180, 220, 225 |
| M-6: (PBT): | 180, 230, 240, 265 |
| M-7. (Silicone rubber): | 150, 150 |
| M-8. (Acrylate resin): | 20, 60 |

Table 2 gives the proportions of the different components in wt. %.

The compositions obtained were injection moulded to form plates with a thickness of 2 mm. On the plates a pattern was written using a diode pumped Nd:YAG UV laser of Lasertec, wavelength 355 nm, and a diode pumped Nd:YAG IR laser of Trumpf, type Vectomark Compact, wavelength 1064 nm.

For comparison purposes similar plates were also made and written that had been manufactured from compositions containing only the third polymers (CP-A-CP-G) and a number that had been manufactured by mixing a masterbatch of the absorber in only polyamide into a matrix polymer (CP-H-CP-M) under the conditions as given above, the temperature profile used being that of the masterbatch or that of the matrix polymer, if that has a higher melting point than the polymer in the masterbatch.

TABLE 1

| | First Polymer | | | Second polymer | | Third polymer | | Fourth polymer | Absorber | | | | Particle size |
|---|---|---|---|---|---|---|---|---|---|---|---|---|---|
| | P1-1 | P1-2 | P1-3 | P2-1 | P2-2 | P3-1 | P3-2 | M7 | A-1 | A-2 | A-3 | MB2 | μm |
| MB1 | 8 | | | 10 | | 40 | | | 42 | | | | 0.1–1.2 |
| MB2 | 14 | | | 1.4 | | 28.6 | | | 56 | | | | 0.2–2 |
| MB3 | 36 | | | | 3.6 | 36.4 | | | 24 | | | | 0.2–2 |
| MB4 | 42 | | | | 4.2 | 25.8 | | | 28 | | | | 0.2–2 |
| MB5 | 48 | | | | 4.8 | 35.2 | | | 12 | | | | 0.2–2 |
| MB6 | 56 | | | | 5.6 | 24.4 | | | 14 | | | | 0.2–2 |
| MB7 | | 12 | | | 10 | 30 | | | 48 | | | | 0.5–1 |
| MB8 | 14 | | | 1.4 | | | 28.6 | | 56 | | | | 0.2–2 |
| MB9 | | | 12 | | 10 | 30 | | | 48 | | | | |
| MB10 | | | 12 | | 7.5 | 32.5 | | | 48 | | | | |
| MB11 | | | 12 | | 5 | 35 | | | 48 | | | | |
| MB12 | | | 12 | | 2.5 | 37.5 | | | 48 | | | | |
| MB13 | 32.46 | | | | 3.2 | 42.7 | | | 21.64 | | | | |
| MB14 | 39.08 | | | | 3.9 | 47.26 | | | 9.76 | | | | |
| MB15 | 25.8 | | | | 4.2 | 42 | | | | 28 | | | |
| MB16 | | | | | | | | 60 | | | | 40 | |
| MB17 | | | | | | | | 50 | | | | 50 | |

The degree to which the different materials are laser writable, expressed in qualitative contrast values, is shown in Table 2. The contrast measurements were carried out with a Minolta 3700D Spectrophotometer with the following settings: CIELAB, light source 6500 Kelvin (D65), spec colour included (SCI) and angle of measurement 10°. The laser settings were continually optimized to the maximum feasible contrast at the used wavelengths of 355 and 1064 nm.

From the results it is clear that the plates manufactured from materials containing the additive according to the invention can be written with a laser with a considerably better result than compositions in which no absorber is present or in which a masterbatch of an absorber mixed into only a first and a third polymer (in this case equal to the first) is applied.

FIG. 1 shows a TEM picture of laser writable composition LP7.

TABLE 2

| Composition | Master-batch | Master-batch | A-1: Antimony trioxide | M-1: PA | M-2: PP | M-3: Arnitel | M-4: Exact | M-5: Sarlink | M-6: PBT | M-7: Silicone Rubber | Contrast 355 nm | Contrast 1064 nm |
|---|---|---|---|---|---|---|---|---|---|---|---|---|
| | MB1 | MB2 | | | | | | | | | | |
| LP1 | 10 | | 4.2 | 90 | | | | | | | ••••• | ••••• |
| LP2 | 10 | | 4.2 | | 90 | | | | | | ••••• | ••••• |
| LP3 | 10 | | 4.2 | | | 90 | | | | | ••••• | ••••• |
| LP4 | 10 | | 4.2 | | | | 90 | | | | ••••• | ••••• |
| LP5 | 10 | | 4.2 | | | | | 90 | | | ••••• | ••••• |
| LP6 | | 5 | 2.8 | 95 | | | | | | | ••••• | ••••• |
| LP7 | | 5 | 2.8 | | 95 | | | | | | ••••• | ••••• |
| LP8 | | 5 | 2.8 | | | 95 | | | | | ••••• | ••••• |
| LP9 | | 5 | 2.8 | | | | 95 | | | | ••••• | ••••• |
| LP10 | | 5 | 2.8 | | | | | 95 | | | ••••• | ••••• |
| LP11 | | 3 | 1.68 | 97 | | | | | | | ••••• | ••••• |
| LP12 | | 3 | 1.68 | | 97 | | | | | | ••••• | ••••• |
| LP13 | | 3 | 1.68 | | | 97 | | | | | ••••• | ••••• |
| LP14 | | 3 | 1.68 | | | | 97 | | | | ••••• | ••••• |
| LP15 | | 3 | 1.68 | | | | | 97 | | | ••••• | ••••• |
| LP16 | | 1 | 0.56 | 99 | | | | | | | ••• | ••• |
| LP17 | | 1 | 0.56 | | 99 | | | | | | ••• | ••• |
| LP18 | | 1 | 0.56 | | | 99 | | | | | •••• | ••• |
| LP19 | | 1 | 0.56 | | | | 99 | | | | ••• | ••• |
| LP20 | | 1 | 0.56 | | | | | 99 | | | ••• | ••• |
| LP21 | | 3 | 1.68 | | | | | | 97 | | ••••• | ••••• |
| LP22 | | 2 | 1.12 | | | | | | 98 | | ••••• | ••••• |
| LP23 | | 1 | 0.56 | | | | | | 99 | | ••••• | ••••• |
| LP24 | | 0.5 | 0.28 | | | | | | 99.5 | | •••• | •••• |
| | MB8 | MB12 | | | | | | | | | | |
| LP25 | 10 | | 4.2 | | 90 | | | | | | ••••• | ••••• |
| LP26 | 5 | | 2.8 | | 95 | | | | | | ••••• | ••••• |
| LP27 | 3 | | 1.68 | | 97 | | | | | | ••••• | ••••• |
| LP28 | 2 | | 1.12 | | 98 | | | | | | ••••• | ••••• |
| LP29 | 1 | | 0.56 | | 99 | | | | | | •••• | •••• |
| LP30 | | 2 | 0.96 | | 98 | | | | | | ••••• | ••••• |
| | MB13 | MB14 | | | | | | | | | | |
| LP31 | 5 | | 1.082 | | | 95 | | | | | ••••• | ••••• |
| LP32 | 3 | | 0.649 | | | 97 | | | | | •••• | •••• |
| LP33 | | 11 | 1.074 | | | 89 | | | | | •••• | •••• |
| LP34 | | 7.5 | 0.733 | | | 92.5 | | | | | ••• | ••• |
| | MB15 | MB17 | | | | | | | | | | |
| LP35 | 5 | | 1.4 | 95 | | | | | | | ••••• | — |
| LP36 | 3 | | 0.84 | 97 | | | | | | | ••••• | — |
| LP37 | 2 | | 0.56 | 98 | | | | | | | •••• | — |
| LP38 | 1 | | 0.28 | 99 | | | | | | | •••• | — |
| LP39 | | 10 | 2.8 | | | | | | | 90 | ••••• | ••••• |
| LP40 | | 5 | 1.4 | | | | | | | 95 | ••••• | ••••• |
| LP41 | | 3 | 0.84 | | | | | | | 97 | ••••• | ••••• |
| CP A | | | | 100 | | | | | | | • | • |
| CP B | | | | | 100 | | | | | | — | — |
| C | | | | | | 100 | | | | | • | • |
| D | | | | | | | 100 | | | | — | — |
| E | | | | | | | | 100 | | | • | • |
| F | | | | | | | | | 100 | | • | • |
| G | | | | | | | | | | 100 | — | — |

TABLE 2-continued

| Composition | Master-batch | Master-batch | A-1: Antimony trioxide | M-1: PA | M-2: PP | M-3: Arnitel | M-4: Exact | M-5: Sarlink | M-6: PBT | M-7: Silicone Rubber | Contrast 355 nm | Contrast 1064 nm |
|---|---|---|---|---|---|---|---|---|---|---|---|---|
| CP H | | | 0.8 | 99.2 | | | | | | | • | •• |
| I | | | 0.8 | 0.2 | 99 | | | | | | — | • |
| J | | | 0.8 | 0.2 | | 99 | | | | | • | • |
| K | | | 0.8 | 0.2 | | | 99 | | | | — | • |
| L | | | 0.8 | 0.2 | | | | 99 | | | • | • |
| M | | | 0.8 | 0.2 | | | | | 99 | | • | ••• |

Qualification of contrast:

| | |
|---|---|
| Very poor contrast and granular | — |
| Poor contrast | • |
| Moderate contrast | •• |
| Good contrast | ••• |
| Very good contrast | •••• |
| Excellent contrast | ••••• |

EXAMPLE III

Of two master batches, MB2 and MB15, additive particles consisting of the first polymer P1-1 and the absorbers A-1 and A-2, respectively, were separated from the third polymer. For this purpose the masterbatches MB15 and MB2 were dissolved in decalin in an autoclave at 140-145° C. and separated at that temperature by means of centrifuging. The resulting additive particles were distributed in concentrations of 20, 10 and 5 wt. % in an acrylate resin (UVTRONIC® of SICPA), stabilized with Disperbyk® (of BYK). The resulting mixture was applied by offset printing on a polyester support. The compositions with the additive particles obtained from MB2 are referred to as LP42-LP 44, those with the from MB15 as 45-LP 47, the successive compositions containing 20, 10 and 5 wt. % additive particles, respectively.

The degree to which the different materials are laser writable was determined as in Example II for the wavelengths 355 and 1064 nm and is shown in Table 3, expressed in qualitative contrast values.

TABLE 3

| Composition | Matrix polymer M-8: Acrylate resin | Absorber: A-1 | Absorber: A2 | First polymer: P1-1 | Wavelength: 355 | 1064 |
|---|---|---|---|---|---|---|
| LP42 | 80 | 16 | | 4 | ••••• | ••••• |
| LP43 | 90 | 8 | | 2 | •••• | •••• |
| LP44 | 95 | 4 | | 1 | •• | •• |
| LP45 | 80 | | 8 | 12 | ••••• | — |
| LP46 | 90 | | 4 | 6 | •••• | — |
| LP47 | 95 | | 2 | 3 | •• | — |

The invention claimed is:

1. Laser light absorbing additive particles comprising:

a support particle comprised of at least a first polymer having a first functional group and an absorber in an amount between 1-95 wt. % based on total weight of the first polymer and the absorber, wherein the absorber is at least one selected from the group consisting of oxides, hydroxides, sulphides, sulphates and phosphates of metals, and a layer surrounding the support particle which is comprised of a second polymer having a second functional group, wherein the layer of the second polymer is bound to the first polymer at a surface of the support particle thereof by means of the first and second functional groups.

2. Additive particles according to claim 1, further comprising a third polymer.

3. Additive particles according to claim 1, in which the second functional group has been bound to the second polymer by grafting.

4. Additive particles according to claim 1, in which the first functional group is a terminal group of the first polymer.

5. Additive particles according to claim 1, in which the second polymer is a polyolefin.

6. Additive particles according to claim 1, in which the first polymer is carbonizable to a degree of carbonization of at least 5%.

7. Additive particles according to claim 6, in which a third polymer is also present.

8. Process for the preparation of the laser light absorbing additive particles according to claim 1, comprising mixing of a composition containing the absorber and the first polymer having the first functional group with the second polymer containing the second functional group that is reactive with the first functional group.

9. Process according to claim 8, in which a third polymer is present during the mixing.

10. Laser writable composition, comprising a matrix polymer and additive particles according to claim 1 distributed therein.

11. Laser writable composition according to claim 10 comprising 0.1 to 10 wt. % of the additive particles.

12. Laser writable composition according to claim 11, comprising 0.5 to 5 wt. % of the additive particles.

13. Laser writable composition according to claim 12 comprising 1 to 3 wt. % of the additive particles.

14. An object having a surface which is provided with a laser writable layer that at least partly comprises the additive particles according to claim 1.

15. Object according to claim 14, wherein at least 80% of the surface consists of a polymer.

16. Object according to claim 14, having a surface wherein at least a part of the surface consists of paper.

17. Paste or latex containing the additive particles according to claim 1 in a dispersion medium.

18. Paste or latex according to claim 17, in which the dispersion medium is water.

* * * * *